United States Patent [19]

Kim

[11] 4,318,891
[45] Mar. 9, 1982

[54] AUTOMATIC TOILET BOWL CLEANER

[76] Inventor: Seung G. Kim, 4341 Willow Brook Ave., Apt. 310, Los Angeles, Calif. 90029

[21] Appl. No.: 230,535

[22] Filed: Feb. 2, 1981

[51] Int. Cl.³ .......................................... B01D 12/00
[52] U.S. Cl. ........................................ 422/263; 4/227;
 4/228; 222/485; 239/60; 422/275; 422/277
[58] Field of Search ................... 4/226, 227, 228, 231;
 422/263, 264, 275–279; 239/58–60; 222/485,
 488, 489

[56] References Cited
U.S. PATENT DOCUMENTS 3,769,640 11/1973 Castronovo .............................. 4/228
3,781,926 1/1974 Levey ....................................... 4/228
4,244,062 1/1981 Corsette .................................. 4/228

FOREIGN PATENT DOCUMENTS 29078 of 1907 United Kingdom ................... 4/227

Primary Examiner—Richard L. Chiesa
Attorney, Agent, or Firm—Erik M. Arnhem

[57] ABSTRACT

A toilet bowl cleaner containing a water soluble disinfectant, comprising a round container and a closure mountable there over, the closure being encircled by two rows of apertures and provided with a cylinder, of a smaller diameter than the container, extending downwardly from the underside of the top of the closure and protruding within the container; said cylinder is provided, at its upper end, with apertures, coinciding with the upper row of apertures of the closure, and a plurality of holes at its lower end to initiate a siphoning action when the water of the toilet tank has dissolved the disinfectant at the level of said lower holes.

2 Claims, 2 Drawing Figures

AUTOMATIC TOILET BOWL CLEANER

BACKGROUND OF THE INVENTION

Field of the Invention

My invention relates to improvements in automatic bowl cleaners, of the type which contains a solid disinfectant; the dispenser of such disinfectants being marketed e.g., under the U.S. registered trademark of Blu Boy and other names, consist of a glass jar capped by a closure, encircled by a single row of square apertures. The bowl cleaner is placed at the bottom of the toilet tank immediately after the water in the tank has been flushed. When the water again rises in the tank, it will, on reaching the level of the apertures in the closure, flow through the apertures into the container and dissolve rather minute quantities of the generally blue colored solid disinfectant contained therein; when the toilet is flushed the solution will flow in with the water and remain standing in the toilet bowl until a subsequent flushing and so on; the disinfecting solution, while standing in the bowl, automatically dissolves stains in and disinfects the latter.

The major drawback of these types of bowl cleaners is, that the solid disinfectant when reaching a lower level in the container, will not easily dissolve in the water entering through its apertures. The reason for this is that the water column in the container becomes higher as the level of the solid disinfectant drops and thus exerts increasing pressure on the latter, preventing it from dissolving properly in and flowing out with the water. The ensuing result is, then that the bowl cleaner loses its effectiveness and the disinfectant practically remains in the lower part of the container, incapable of being carried along with the water into the toilet bowl.

This drawback is eliminated by my invention, as will be fully explained.

Summary of the Invention

More particularly, the toilet bowl cleaner, according to the invention, is so constituted that it will permit the successive dissolving and pouring out of virtually all of the disinfecting chemical in the bowl cleaner container. As noted above this could hitherto not be accomplished with the conventional type of toilet bowl cleaner provided with one row of apertures encircling the upper portion of the closure of same. The action of the latter is practically limited, in that the water level in the tank, when reaching the row of encircling apertures will cause the solution (of water and disinfectant) to merely flood out through these apertures, and the water pressure on the hard disinfectant will gradually prevent the latter from dissolving properly. The closure of the bowl cleaner container, according to the invention, then is provided—in addition to the mentioned conventional row of apertures—with a second lower row of apertures staggered relative to the upper ones, and a cylinder extending from the underside of the top of the closure along a portion of the height of the container; the upper portion of the cylinder is also provided with a row of encircling apertures which are arranged to coincide with the first row of apertures in the container closure; finally the lower portion of the cylinder is provided with small round holes arranged in zigzag order. The second row of apertures, as noted, are staggered relative to the first row of apertures, in order to reinforce the material of the closure.

When the bowl cleaner is functioning, according to the invention, the dissolved chemical is firstly pouring out through the apertures in the cylinder and the first upper row of apertures coinciding therewith. When the solid disinfectant reaches the level of the round holes in the lower part of the cylinder, a siphon action is initiated, in that the solution inside the cylinder is forced through these holes and upwardly in the container, pouring out, and carrying along the solution present between the cylinder and the interior wall of the container, through the second row of container apertures.

Thus, it is the primary object of the invention to provide an improved automatic bowl cleaner, of the general type described, which ensures a totally effective consumption of the disinfectant contained therein.

It is a further object of the invention to provide such an automatic bowl cleaner which generally is not more costly to manufacture than the conventional comparable type bowl cleaner.

DESCRIPTION OF THE INVENTION

Figure 1:
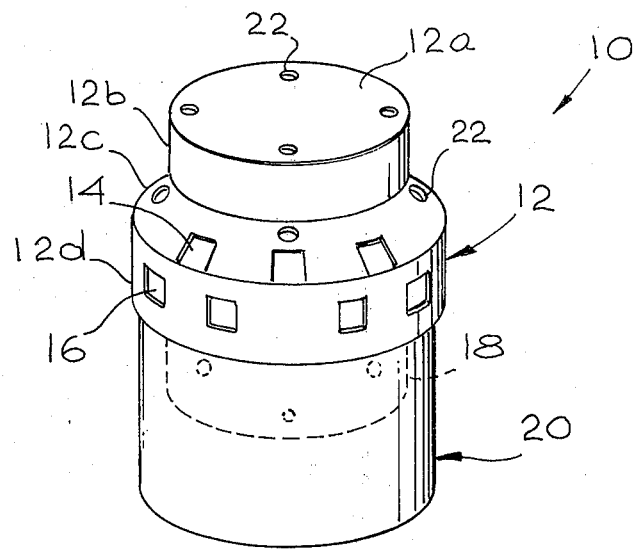
FIG. 1 is a perspective exterior view of a bowl cleaner container in its entirety, according to the invention.
Figure 2:
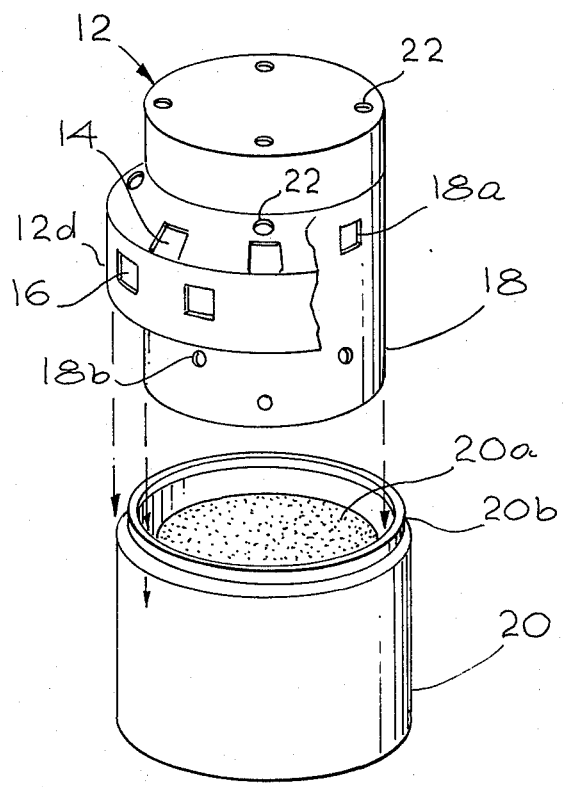
FIG. 2 is an exploded perspective view of the bowl cleaner container, portions of its closure, having been broken away.

In the drawings like reference characters designate similar parts in the two views of the drawings.

In FIG. 1, numeral 10 indicates the toilet bowl cleaner in its entirety.

The closure 12, preferably made of plastic, consists of a disk 12a and an apron 12b, which extends into an outwardly inclining first section 12c, provided with a first row of, e.g. eight evenly spaced apart, preferably square apertures 14; the free edge of section 12c extends parallely to apron 12b of closure 12 into a second section 12d, having a second row of, evenly spaced apart, preferably square apertures 16, which, however are arranged staggered relative to apertures 14, as illustrated in FIG. 1.

Within closure 12 and mounted to the underside of closure disk 12a, extends siphoning means, e.g., an open ended cylinder 18 (indicated in dotted lines in FIG. 1), having substantially the same diameter as closure top 12a, partially into container 20; a circular space then exists between the outer circumference of cylinder 18 and interior wall of the inclining section 12c, and section 12d, respectively portion of the circular wall of container 20. The upper part of cylinder 18 is provided with a row of, preferably eight square apertures 18a, so arranged that they will coincide with apertures 14 of section 12c; the lower part of cylinder 18, i.e., that portion thereof protruding below section 12d, is provided with a number of small round holes 18b, arranged in zigzag formation. Container 20, preferably made of glass, holds a solid disinfecting chemical 20a impregnated with a blue dyestuff, filling the space within the cylinder and between the latter and the interior container wall.

The upper edge of container 20 is recessed at 20b, so that the free edge of section 12d of closure 12 may be tightly and securely fitted over the upper part of container 20. As noted, the bowl cleaner container is initially placed at the bottom of the toilet tank to be completely submerged in the water filling up therewithin.

When flushing the toilet and with the water dropping down to the first row of apertures 14 in container closure 12, the solution (consisting of water and dissolved disinfectant) filling the upper interior of the cylindric extension 18 of the closure 12, will pour out through the coinciding apertures 18a of the cylinder 18 and first row of apertures 14.

As the water level in the tank continues to drop, the solution forming within the cylinder 18 and between the latter and the interior wall of closure 12 is then flooding out through the lower row of apertures 16; when the water level reaches below the latter, the flow of solution from the container will cease. This action will repeat itself each time the water in the tank is flushed, until the disinfectant is dissolved down to the level of the smaller round holes 18b in the cylinder 18. At that point the solution within the cylinder 18 is forced down through the round holes 18b, upwardly and out of the second row of apertures 16 encircling the closure 14; this siphon action will repeat itself whenever the tank is filling up with water, until the disinfectant 20a has been completely dissolved and poured out with the water. This siphon action will even increase when the level of disinfectant 20a drops down below cylinder 18; the solution accumulating below cylinder 18, will, thus likewise be forced upward and poured out through apertures 16, due to the water pressure (18 m/m water head) between the first and second row of apertures being exerted thereon. The small holes 22 are intended for the escape of air inside the bowl cleaner.

The ultimate point of the invention is then that my novel bowl cleaner is capable of even dissolving the solid disinfectant remaining at the bottom of the container, so that same may be flooded out in the solution through the second row of apertures in the closure.

The preferred approximate dimensions of the toilet bowl cleaner, according to the invention, are as follows:
Height of container 20: $2\frac{3}{4}''$
Total height of closure 12: $2\frac{1}{4}''$
Diameter of disk 12a: 2"
Height of apron 12b: $\frac{3}{4}''$
Height of section 12c: $\frac{3}{4}''$
Height of section 12d: 1"
Diameter of cylinder 18: 2"
Length of cylinder 18: $2\frac{1}{2}''$
Distance between cylinder 18 and section 12d: $\frac{1}{2}''$ While the foregoing has illustrated and described what is now contemplated to be the best mode of carrying out the invention, the description is, of course, subject to modifications without departing from the spirit and scope of the invention. Therefore, it is not desired to restrict the invention to the particular constructions illustrated and described, but to cover all modifications that may fall within the scope of the appended claims.

I claim:

1. In an automatic bowl cleaner, placeable in a toilet water tank and containing a water soluble solid disinfectant, flowing into the flushing water of the toilet, comprising:
   (a) a container for the disinfecting material;
   (b) a closure, mounted over the container, constituted by an aproned disk extending into an outwardly inclining first section, encircled by a first row of apertures, the lower edge of the first section terminates in a second section, encircled by a second row of apertures, being arranged staggered relative to those of the first row of apertures, said second section extending parallely to the apron of the disk;
   (c) siphoning means, mounted inside the closure to facilitate the outpouring of the water soluble disinfectant, when dropping to lower levels in the container.

2. A toilet bowl cleaner, according to claim 1, wherein the siphoning means is an open ended cylinder, mounted within the underside of the top of the closure, extending downwardly and protruding below the closure and along a height portion of the container, said cylinder having at its upper portion a row of apertures coinciding with the first row of apertures in the closure, and, at the lower portion, a plurality of holes, through which the siphoning action is initiated when the disinfecting chemical drops to the level of said plurality of holes.

* * * * *